United States Patent [19]
Cartry et al.

[11] Patent Number: 4,918,808
[45] Date of Patent: Apr. 24, 1990

[54] DEVICE FOR REMOTELY LINING A STEAM GENERATOR TUBE OF A PRESSURIZED WATER NUCLEAR REACTOR

[75] Inventors: Jean P. Cartry; Bruno Fraissenet, both of Lyons, France

[73] Assignee: Framatome, Courbevoie, France

[21] Appl. No.: 274,893

[22] Filed: Nov. 22, 1988

Related U.S. Application Data

[62] Division of Ser. No. 44,254, Apr. 30, 1987, Pat. No. 4,793,044.

[30] Foreign Application Priority Data

Apr. 30, 1986 [FR] France .............................. 86 06342

[51] Int. Cl.$^5$ ............................................. B23P 15/26
[52] U.S. Cl. ........................................ 29/727; 29/723
[58] Field of Search ............. 376/260; 72/58; 29/727, 29/723, 726, 157.4, 157.3 A, 157.3 B, 157.3 C, 157.3 R, 402.01, 402.02, 402.09; 165/76, 11.2

[56] References Cited

U.S. PATENT DOCUMENTS 4,639,994 2/1987 Cooper, Jr. et al. ................. 376/260
4,793,044 12/1988 Cartry et al. ......................... 376/260

Primary Examiner—Daniel Wasil
Attorney, Agent, or Firm—Pollock, Vande Sande & Priddy

[57] ABSTRACT

A liner (12) is inserted into the water box (3) through the manhole (9) vertically in line with the manhole, and then the liner (12) is moved as far as a position situated vertically in line with the tube (8) to be lined. The operations of inserting the liner (12) into the tube (8), of diametral expansion and of roller-expanding are performed by inserting a corresponding appliance into the water box (3) and using this appliance from an operating station outside the water box, where the drive for the appliance is situated.

8 Claims, 12 Drawing Sheets

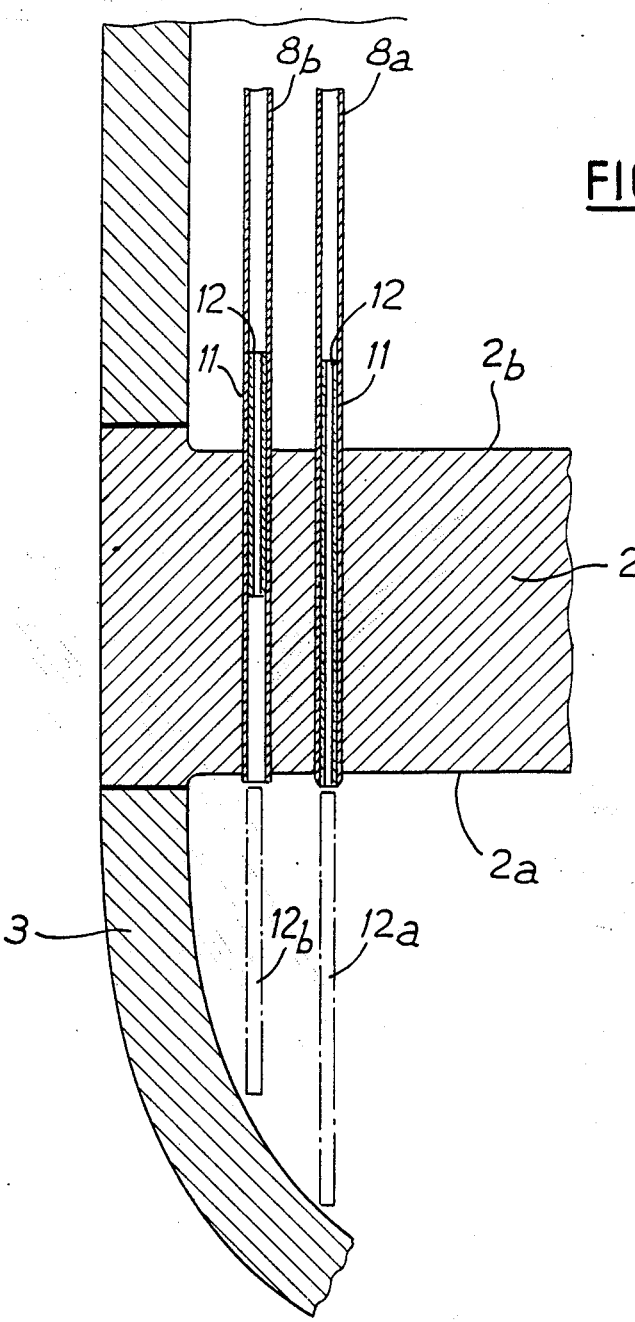

FIG.3a
FIG.3b
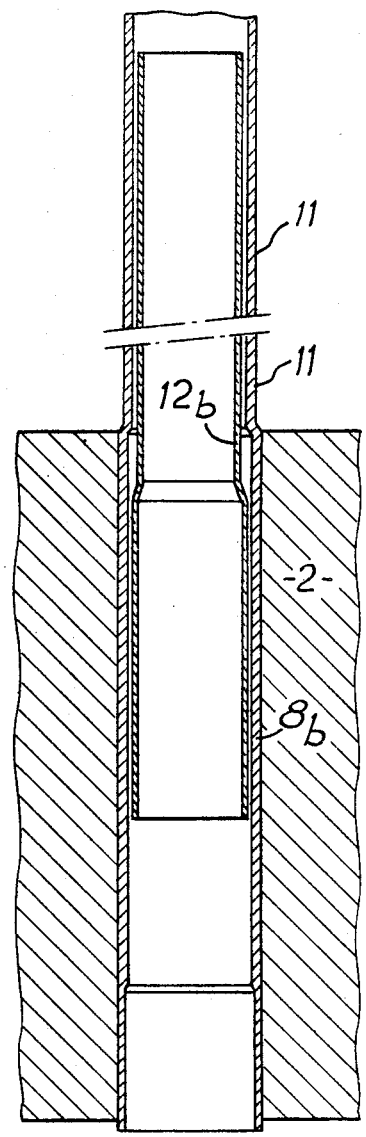
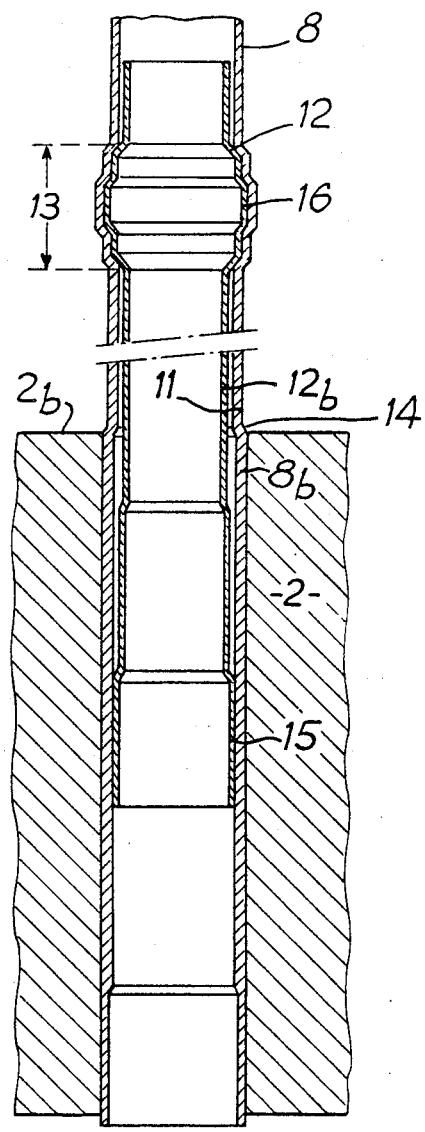

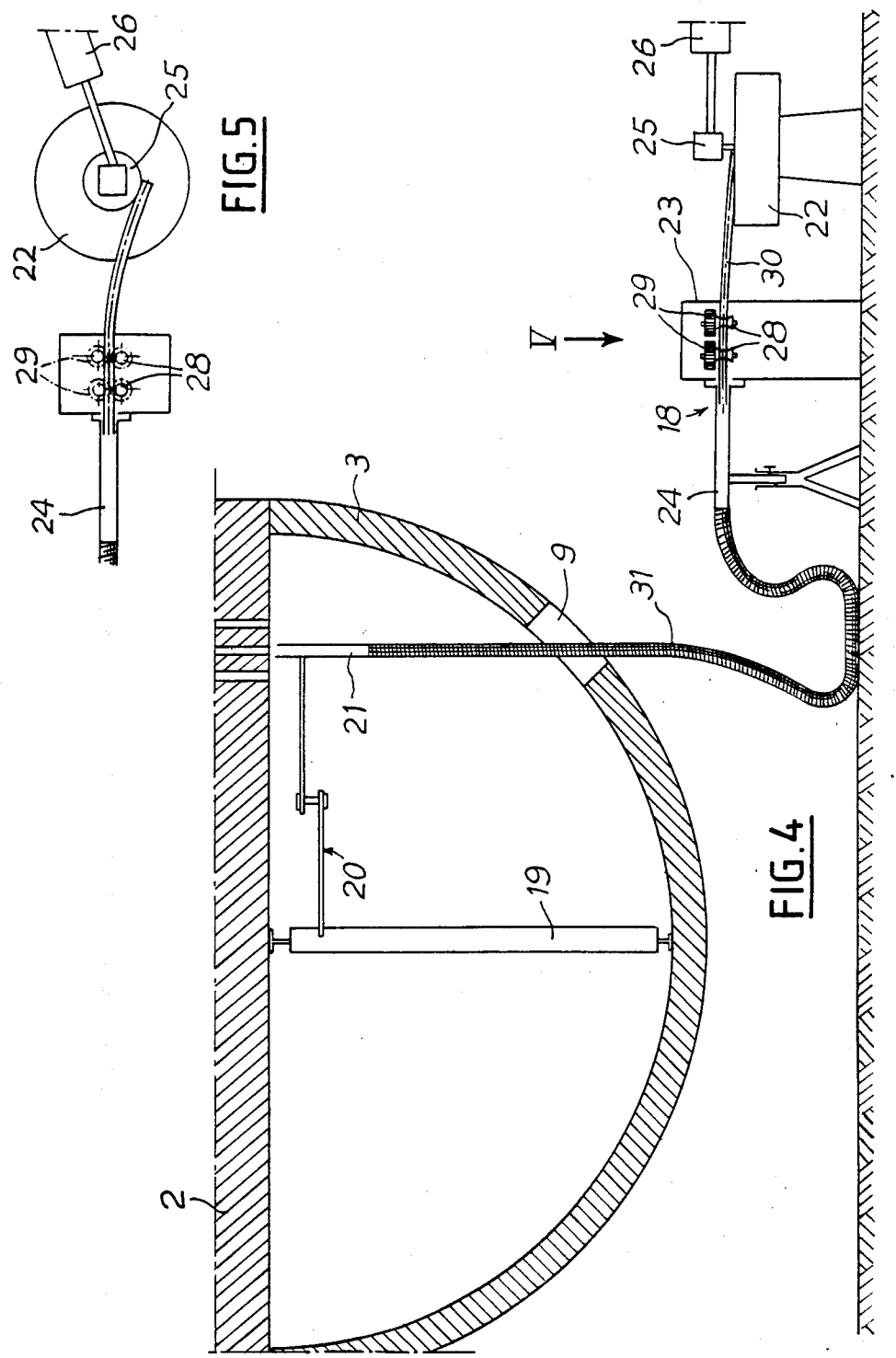

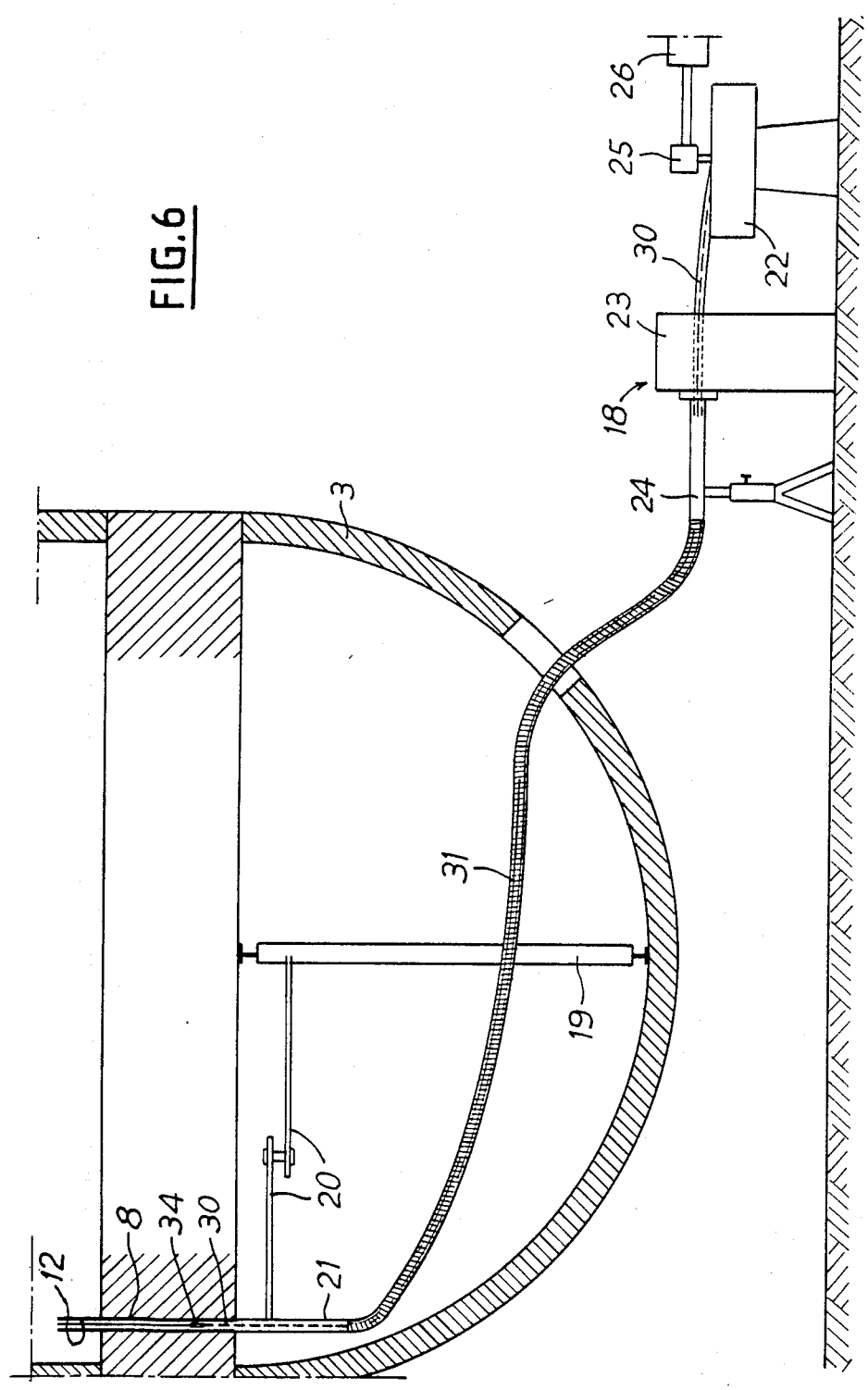

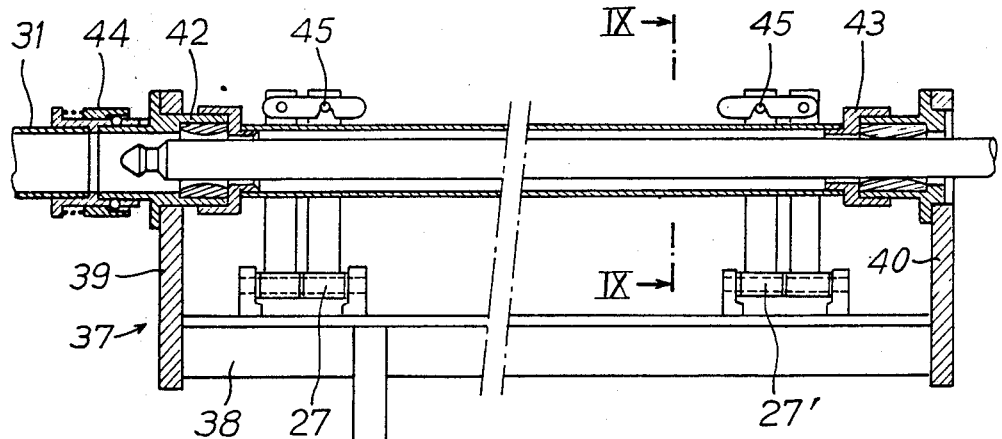
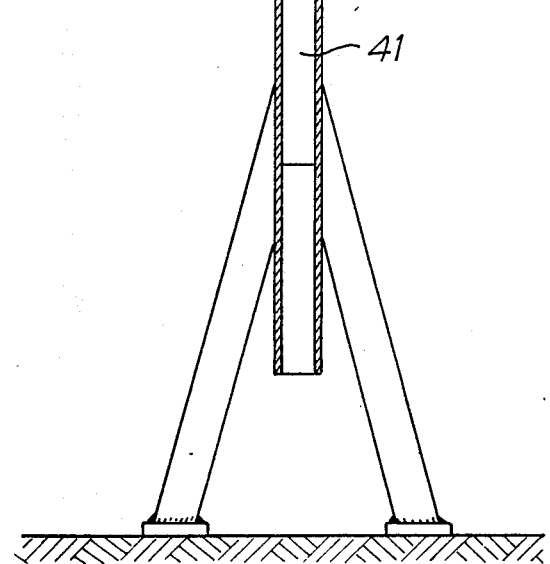
FIG.8
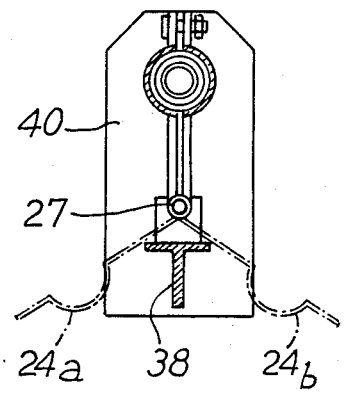
FIG.9

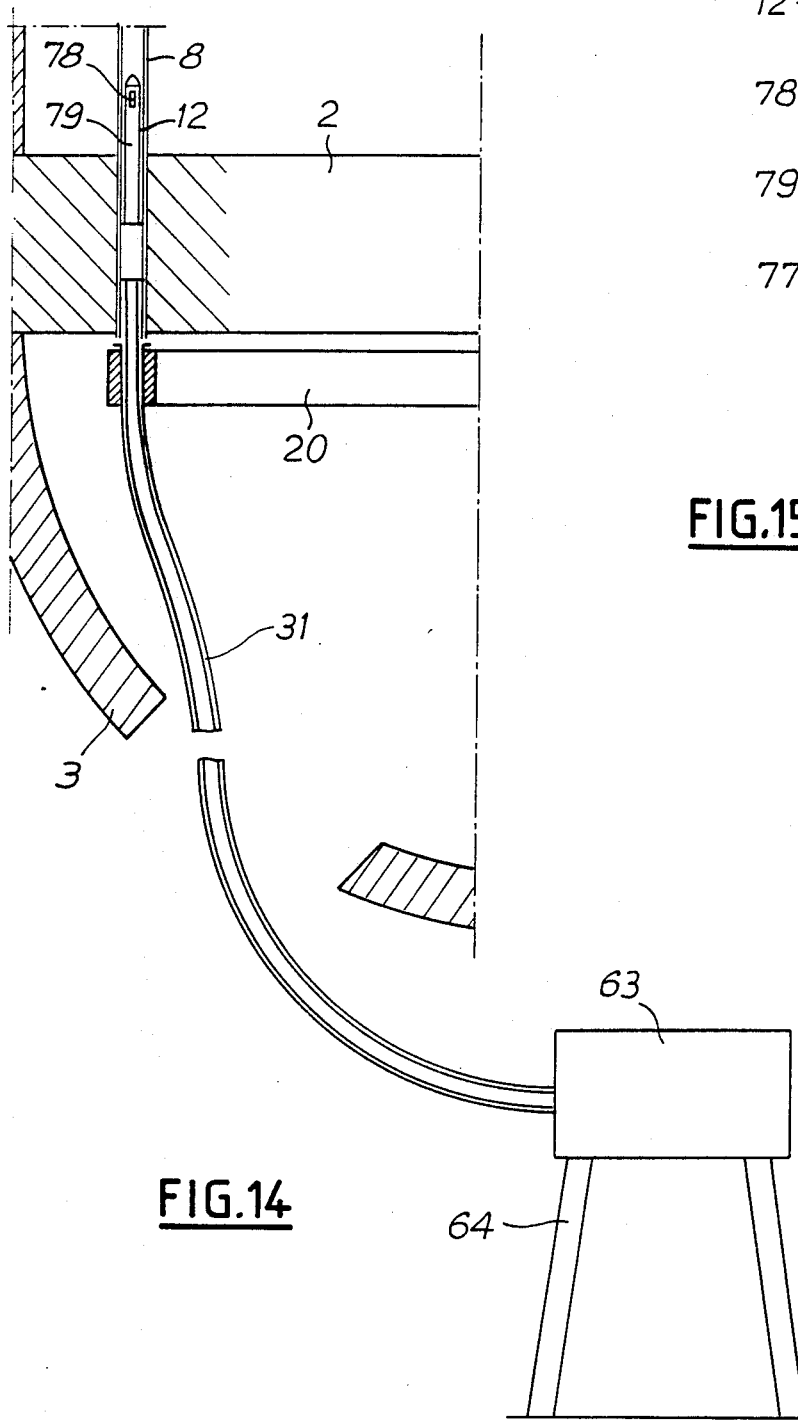
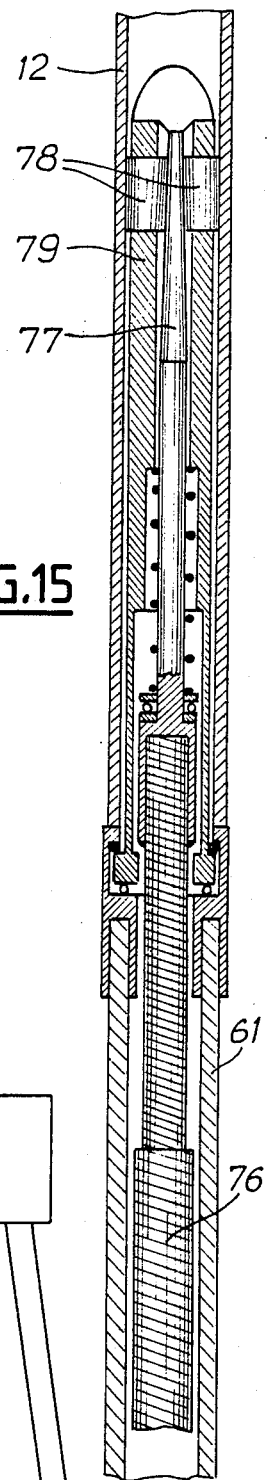
FIG.14
FIG.15

DEVICE FOR REMOTELY LINING A STEAM GENERATOR TUBE OF A PRESSURIZED WATER NUCLEAR REACTOR

This is a Division, of application Ser. No. 044,254, filed Apr. 30, 1987, now U.S. Pat. No. 4,793,044.

FIELD OF THE INVENTION

The invention relates to a device for remotely lining a steam generator tube of a pressurized water nuclear reactor.

BACKGROUND OF THE INVENTION

Steam generators of pressurized water nuclear reactors generally comprise a bundle consisting of a very large number of narrow-bore tubes bent into a U and fastened at each of their ends by crimping into a thick tube plate. The part of the steam generator which is situated below the tube plate forms a water box, in a first part of which the pressurized water coming from the reactor vessel is distributed into the bundle tubes, and in a second part of which the water which has circulated in the tubes is recovered, to be re-directed, via a primary circuit conduit of the reactor, into the vessel enclosing the core, which consists of fuel assemblies responsible for the heating of the pressurized water. The steam generator feed water comes into contact with the outer surface of the bundle tubes, in the part of the steam generator which is situated above the tube plate.

The walls of the bundle tubes thus constitute a barrier between the pressurized water forming the primary fluid of the reactor and the feed water forming the secondary fluid. The primary water, which comes into contact with the fuel assemblies and the internal structures of the reactor vessel, contains radioactive products in more or less substantial quantities. The steam produced in the steam generator, by heating and vaporization of the feed water, is conveyed to a turbine associated with the nuclear reactor. It is therefore necessary to avoid any contact between the primary fluid and the secondary fluid, whose contamination could have highly detrimental consequences.

It is thus necessary to avoid as completely as possible the appearance of leakages through the walls of the bundle tubes of the steam generator and to repair as quickly as possible and effectively the bundle tubes whose wall has been perforated.

Because of the stresses of thermal and mechanical origin or the corrosion to which the bundle tubes are subjected, cracks can form in the walls of the bundle tubes, both on the primary side and on the secondary side, while the steam generator is in use.

In order to increase the lifespan of the steam generators and to ensure that this lifespan is similar or equal to that of the other components of the reactor, interventions or repairs must be carried out to the bundle tubes, during the periods of maintenance of the nuclear reactor.

To date one of the most widely used techniques has consisted in taking the defective tube or tubes out of service by inserting and fastening a plug in a leakproof manner in the end of the tube which is flush with the tube plate and which the primary water enters. A disadvantage of this technique is that it reduces the exchange surface of the steam generator, the degree of such reduction increasing with the number of tubes taken out of service.

Processes for repairing the bundle tubes of a steam generator by lining these tubes have therefore been proposed, where the defect leads to a seal loss. A tubular sleeve or liner, with an external diameter which is slightly smaller than the internal diameter of the tube to be repaired and with sufficient length to overlap the defect, is inserted into the tube, through the entry face of the tube plate with which the ends of the tubes are flush. The liner itself is placed in the tube, inside the tube plate, so as to be flush with the entry face of the tube plate. The liner is then fastened to the interior of the tube by diametral expansion, followed by one or more operations permitting a leakproof connection to be made between the sleeve and the tube on each side of the defective region of the tube.

In particular, it is known to perform a diametral expansion of the liner in two regions in the vicinity of its ends, situated, in the case of one, within the thickness of the tube plate in the vicinity of its entry face and, in the case of the other, beyond the exit face of the tube plate, so that these two regions are situated on either side of the defective region of the tube to be repaired. The leakproof joint between the liner and the tube is produced by a roller-expanding operation on the liner in each of the regions which have been subjected to the diametral exapanion.

All these operations require an intervention inside the water box of the steam generator, i.e., in a part of this generator which comes into contact with the primary water carrying radioactive products, while the reactor is in operation.

When these operations are performed manually, an operator has to enter the water box, where he is exposed to high radioactivity. The time for which the operator is present in the water box must therefore be reduced to the minimum, with the result that it is possible to perform only a small proportion of the tasks required for lining a tube, when this is done by an operator. This operator then becomes unavailable for continuing the operations of lining the tubes inside the water box, since his radiation dose reaches the upper limit which is gnerally permitted. In order to perform the operations on a steam generator, especially in the case where several tubes need to be lined, a large number of competent and trained operators must therefore be available, and this considerably increases the manpower costs during the maintenance operations on the nuclear reactor.

Automatic appliances have therefore been proposed for performing at least partially the operations which are necessary for lining the tubes of a steam generator. Such appliances, which must perform the placing of the liner in a specified tube of the steam generator, then its expansion, its roller-expanding and/or its welding in a completely automatic manner, are extremely complicated and extremely bulky, since they need to comprise all the means necessary for the various successive stages of the lining operation and, in particular, all the means for driving the various tools used in succession. Furthermore, the capacity of such an appliance, insofar as the number of tubes which can be lined one after another without withdrawing the appliance from the water box is concerned, is, after all, limited by the maximum number of liners with which the appliance can be equipped at the time when it is inserted into the water box. Devices which have a barrel magazine containing several liners which can be presented in succession have been designed, to enable the latter to be inserted into the tubes to be lines. However, the capacity of such barrel magazines must be limited if excessive bulk and complexity of the appliance are to be avoided.

SUMMARY OF THE INVENTION

The purpose of the invention is therefore to propose a device for remotely lining a steam generator tube of a pressurized water nuclear reactor, the tube having two ends crimped into a tube plate below which the steam generator forms a water box accessible from outside via a manhole. The process comprises, in a known manner, the insertion of a liner into the tube through one of its ends, the diametral expansion of the liner in at least two regions situated in the vicinity of its ends, one of these regions being within the thickness of the tube plate and the other beyond this tube plate and, lastly the roller-expanding of the tube in each of the expansion regions, this process making it possible to perform the lining in a completely automatic manner from an operating station situated outside the water box, with a simple appliance of low bulk, having an unlimited intervention capacity.

To this end, in an automatic manner, with remote control from an operating station situated outside the water box, a liner is inserted into the water box, through the manhole, as far as a location situated under the tube plate vertically in line with the manhole, the liner is moved inside the water box as far as a position situated under the tube plate vertically in line with one of the ends of the tube to be lined, and the operations of insertion of the liner into the tube, of diametral expansion and of roller-expanding, in the region situated outside the tube plate, are performed by inserting a corresponding appliance into the water box and using this appliance by controlling driving means situated at the opeating station outside the water box.

The invention also relates to a device for carrying out the lining process according to the invention from an operating station situated outside the water box.

BRIEF DESCRIPTION OF THE DRAWINGS

In order that the invention may be more clearly understood, a description will now be given, by way of example, of a device for remotely lining steam generator tubes of a pressurized water nuclear rector and for using it in a lining process according to the invention.

FIG. 2 is an enlarged view in partial section of a part of a steam generator and of two lined tubes of this steam generator.

FIG. 3a is an enlarged sectional view of a steam generator tube, in an intermediate stage of a lining operation.

FIG. 3b is an enlarged sectional view of a steam generator tube, at the end of a lining operation.

FIG. 4 is a general diagrammatic view of the appliance used during the insertion of a lining liner into the water box of a steam generator.

FIG. 5 is a view along V of FIG. 4.

FIG. 6 is a general diagrammatic view of the appliance used during the stages of insertion and of expansion of a lining liner in a steam generator tube.

FIG. 8 is a sectional view through a vertical plane of a loading box forming part of the appliance* shown in FIGS. 4 and 6.

FIG. 9 is a view along IX—IX of FIG. 8.

FIG. 14 is a diagrammatic sectional view of the roller-expanding tool assembly.

FIG. 15 is a detailed sectional view of the end part of the roller-expanding tool shown in FIG. 14.

DESCRIPTION OF PREFERRED EMBODIMENT

Figure 1:
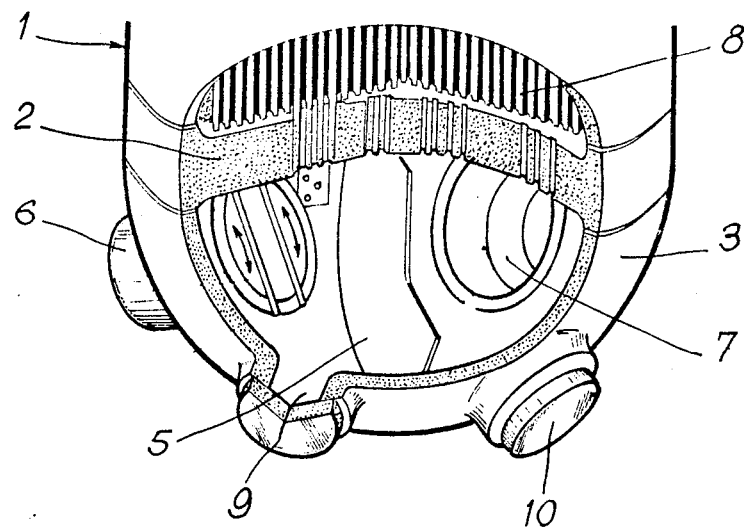
FIG. 1 is a perspective view, with cutaway, of the water box of a steam generator.

FIG. 1 shows a steam generator 1 comprising a thick tube plate 2 under which the lower part of the steam generator forming a water box 3 is fastened. The water box 3, of hemispherical shape, is divided into two parts by a partition 5. The high-temperature pressurized water from the nuclear reactor enters one of the parts of the water box through a pipe 6 and then circulates in the bundle tubes 8 of the steam generator, first upwards and then downwards, to come out into the second part of the water box, into which opens a pipe 7 connected to the primary circuit of the nuclear reactor, for returning the pressurized water to the reactor vessel.

Each of the parts of the water box 3 is provided with a manhole 9 which can be closed by a closure cover 10.

FIG. 2 shows a part of the tube plate 2 of the steam generator, through which the ends of two tubes 8a and 8b pass and are crimped by roller-expanding within holes which pass through the tube plate. The tubes 8a and 8b either project very slightly from, or are flush with, the lower face 2a, or entry face, of the tube plate 2. The tubes 8a and 8b pass through the exit face 2b of the tube plate to enter the upper part of the steam generator receiving the feed water, which is heated and vaporized by the pressurized water circulating in the tubes 8. The tube region in the vicinity of the exit face 2b of the tube plate, which corresponds to the transition zone between the part distorted by roller-expanding and the undistorted part of the tubes, is generally the part of the tube which is the most liable to cracking, especially due to the action of corrosion. In order to repair the tubes cracked in the region 11 in the vicinity of the exit face 2b of the tube plate, a lining operation may be performed by inserting and fastening into the cracked tube a liner 12 overlapping the region 11 in which the tube is cracked.

FIG. 2 shows two types of liner 12a and 12b which enable the repair of tubes 8a and 8b, respectively to be carried out. Liner 12a, whose length is greater than the thickness of the tube plate 2, may be inserted, from the entry face 2a of the tube plate, into any tube which it is necessary to repair, so that the lower end of the liner is situated in the region of the entry end of the tube 8. The upper part of the liner then overlaps the region 11 in which the tube 8a is cracked.

However, in the case of peripheral tubes such as tube 8b, it has proved impossible to insert into this tube a liner of a length greater than the thickness of the tube plate, because of the hemispherical shape of the water box 3. It is then possible to use a short liner 12b, whose length is appreciably smaller than the thickness of the tube plate. This liner 12b is placed inside the tube 8b so as to overlap the cracked region 11. Its lower end is then within the tube plate and not at the level of the entry face 2a of this tube plate.

This new process for lining the peripheral tubes of a steam generator is the subject of a patent appliaction by the assignee of the present applicants filed on the same date as the present application.

FIGS. 3a and 3b show a peripheral tube 8b in the process of being lined and after the lining operation, respectively, using a short liner 12b.

In FIG. 3a, the liner 12b inserted into the tube 8b has undergone a diametral expansion in its smaller part situated in the part of the tube 8b which is roller-expanded inside the tube plate 2. This intermediate stage of the lining is followed by a stage during which the diametral expansion of the liner 12 is produced in a region 13 situated above the transition zone 11 in which a crack 14 has been detected. This diametral expansion is performed in a region which is beyond the exit face 2b of the tube plate, i.e., outside the region of the tube 8 which is crimped into the tube plate 2.

The liner 12b is then roller-expanded inside the tube 8 in its end zone 15, situated within the crimped part of the tube 8.

Lastly, the liner 12 is also roller-expanded inside the tube 8 in a region 16 situated within the diametral expansion region 13.

The roller-expanding operations which are performed in the regions 15 and 16 inside the regions of the liner 12 which have previously been subjected to a radial expansion make it possible to ensure a leakproof joint between the liner 12 and the tube 8 on either side of the region 11 comprising a crack 14. The tube 8 can then once again ensure the separation between the primary fluid and the secondary fluid, after the steam generator has been started up.

The sealing of the roller-expanded regions 15 and 16 may be improved by brazing or welding.

The operations just described are known in the prior art and, to be implemented, require the intervention by an operator in the water box of the steam generator, or the use of a semi-automatic device, which is complicated, bulky and limited in capacity.

The object of the invention is to propose a process and a device enabling these disadvantages to be overcome.

FIGS. 4, 5 and 6 show the set of means required for performing the insertion of a liner into the water box 3, from an operating station 18 situated outside this water box, followed by the installation of the liner in a tube to be repaired and, lastly, the diametral expansion of the liner in two regions in the vicinity of its ends, as shown in FIGS. 3a and 3b.

In FIG. 4, the components of the device are in their position which permits the liner to be inserted into the water box.

In FIG. 6, the corresponding components are in their position enabling the liner to be inserted into the tube to be repaired and to be expanded hydraulically.

The steam generator tube lining operations are carried out on the steam generator which has been stopped, emptied of water and cooled, at least one of the manholes 9 being open to allow the insertion of appliances into the water box.

Before the lining operations as such, a manipulating device 19 is inserted and mounted in the water box 3, this device being well known in the prior art and comprising an arm 20 made up of two articulated sections allowing an appliance to be positioned under the tube plate 2, precisely vertically in line with the end of any tube of the bundle.

Figure 7:
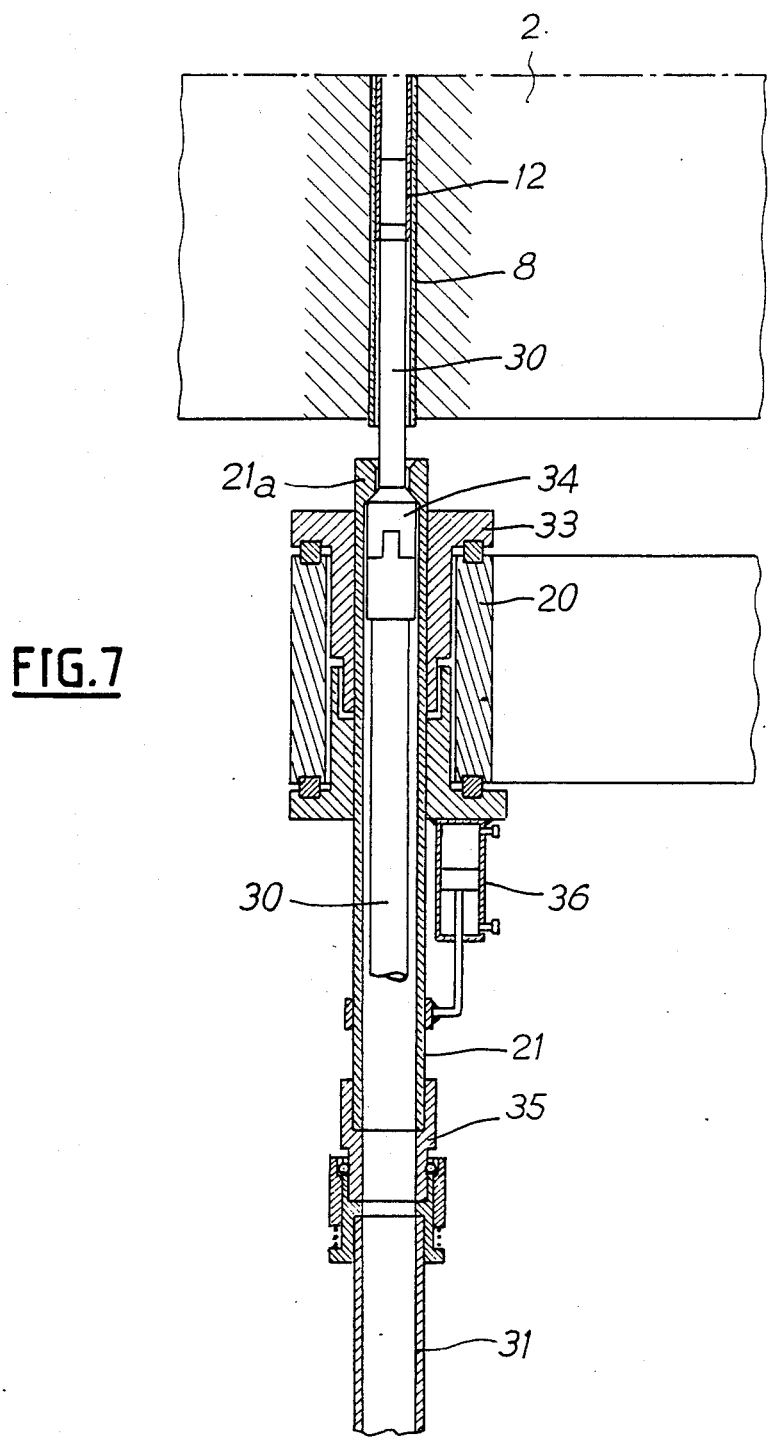
FIG. 7 is a sectional view of a device for guiding and for insertion of the appliance into a steam generator tube in which a lining operation is performed.

In order to implement the invention, a guiding and insertion device 21, of overall tubular shape, which will be described in more detail with reference to FIG. 7, is attached to the end of the arm 20, in a vertical position.

In FIG. 4, the position of the arm 20 of the manipulating device 19 is such that the tubular guiding member 21 is vertically in line with a manhole 10 of the water box 3. In this position, a lining liner can be inserted into the water box.

The components of the device which are situated at the operating station 18 outside the water box comprise a winding and unwinding device 22, a puller-pusher 23 and a loading tube 24. A rotating coupling 25 connected to a high pressure fluid source 26 is coupled to the winding and unwinding device 22, to supply high pressure fluid to a flexible tube which is manipulated by the winding and unwinding device 22.

As can be seen in FIGS. 4 and 5, the puller-pusher 23 has rollers 28 which are integrally fastened to gears 29 driven by a driving device which is (not shown). A flexible tubular member 30 stored in the winding and unwinding device 22 and connected to the pressure source 26 via the coupling 25 passes between the driving rollers 28 of the puller-pusher, which can make it travel in either direction. The loading tube 24 is attached at one of its ends to the outlet of the puller-pusher and, at its other end, is connected to a flexible tube 31 which provides the connection between the outlet of the loading tube 24 and the tubular guiding and insertion member 21 inside the water box. This flexible tube 31, about 5 meters in length, enables the operating station 18 to be placed completely outside the region which is exposed to the radiation from the water box 3. This tube 31 will preferably consist of a stainless steel tube having successive undulations over its entire length and surrounded by a protective plaited sheath made of stainless steel wires.

FIG. 7 shows the tubular guiding member 21 connected to the end of the arm 20 by means of a liner 33 in which the tubular member 21 is mounted so that it can slide. A double-action jack 36 whose body is attached to the liner 33 and whose rod is coupled to the tubular member 21 enables this member 21 to be moved in either direction or to be held in position.

At its upper end 21a, the tubular member 21 has an internal diameter which is smaller than in its running part and forms a re-entrant profile which enables it to exert a pull on the hydraulic expander 34 connected to the end of the flexible tubular member 30 when the latter is in engagement with the liner 12 in a tube 8 which is being repaired. The double-action jack 36 thus makes it possible to exert a pull on the expander, at the end of the stage of hydraulic expansion of the liner, as will be explained later. The double-action jack 36 also makes it possible, after the arm 20 has been positioned vertically in line with a tube 8, to position the upper end of the tubular guiding member 21 so that it is in the immediate proximity of the projecting end of the tube 8 or is even in engagement with the latter, when the tube 8 extends beyond the tube plate, since the upper end of the tubular member 21 is funnel-shaped.

The lower end of the tubular member 21 is connected via a rotary ball coupling 35 to the flexible tube 31, so that the tube 31 can rotate relative to the tubular guiding member 21.

FIG. 8 shows that the loading tube 24 is mounted on a supporting structure 37 comprising a longitudinal girder 38 consisting of a T-section beam, two flanges 39 and 40 fastened to the ends of the longitudinal girder 38, and an adjustable supporting tripod 41. The tube 24 itself consists of two half-covers 24a and 24b mounted articulated around pivots 27 and 27', on the support 37. In FIG. 9, the two half-covers 24a and 24b are shown in full lines in their closed position and in broken lines in their open position. In their closed position, the two half-covers form a continuous and closed tube, connected at its ends to couplings 42 and 43 which are integrally fastened to the flanges 39 and 40, respectively. The coupling 42 enables the end of the flexible tube 31 to be connected to the outlet of the loading tube 24, by virtue of a fast-acting snap coupling 44 fitted with a locking means and a ball assembly allowing the flexible tube 31 to rotate relative to the loading tube 24. Thus, at one of its ends, the flexible tube is fastened to the tubular guiding member 21 inside the water box 3 and, at its other end, to the loading tube 24, outside the water box. Furthermore, both ends of the tube are so mounted that they can rotate freely on the components to which they are coupled.

The coupling 43 provides the connection between the loading tube 24 and the puller-pusher 23, so that the flexible tubular member 30 coming from the winding and unwinding device 22 can pass from the puller-pusher to the loading tube without any interruption of guidance.

Two fast-locking devices 45 allow the two half-covers 24a and 24b to be locked in a closed position. A safety interlock prevents the operation of the puller-pusher when the half-covers 24a and 24b are in an open position.

A force-sensor (not shown), is placed between the loading tube 24 and the quick coupling 44 to ensure that the puller-pusher stops automatically, should the measured force exceed some predetermined value.

Figure 10:
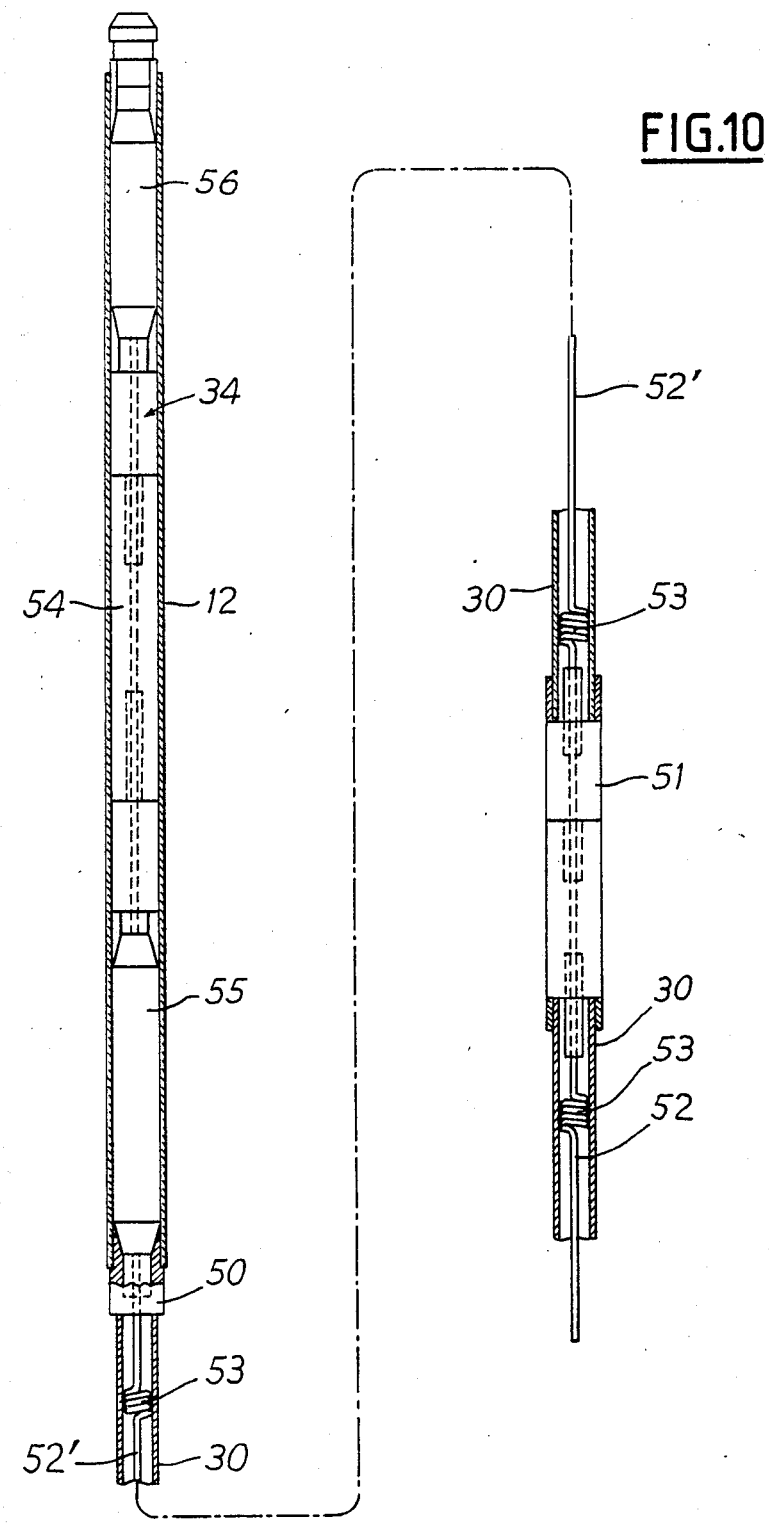
FIG. 10 is a sectional view of a device for the diametral expansion of a lining liner.

FIG. 10 shows a liner 12 which can be used for lining a steam generator tube, into which has been inserted a hydraulic expander 34, one of whose ends is connected, by virtue of a fixed coupling 50, to a length of flexible tube similar to the tube 30 stored in the winding device 22 and moved by the puller-pusher 23, this length of flexible tubing being itself connected to the end of the flexible tube 30 by means of a removable coupling 51, consisting of two parts. For this purpose, one of the parts of the removable quick coupling 51 is fastened to the end of the flexible tube 30 and the other part to the end of the intermediate length fastened to the expander.

The coupling 50 has a shoulder on which the liner 12 abuts when it is inserted into the expander mandrel. The coupling 50 has a shoulder which comes to bear on the lower face of the tube place (in the case of the short liners) and which thus positions the liner at the required height in the tube 8.

Arranged inside the tube 30 is a capillary tube 52, one end of which is fastened in the part of the quick coupling 51 which is integrally attached to the tube 30, and the other end of which is connected to the rotary coupling 25 of the winding device 22. An identical capillary tube 52' is fastened in the flexible length connected between the expander 54 and the coupling 51. One of the ends of this capillary tube 52' is connected to the expander 34 by means of the fixed coupling 50, and the other end of this capillary 52' is connected to the part of the removable quick coupling 51 connected to the flexible connecting length. The snap fastening of the quick coupling 51 enables the capillaries 52 and 52' to be joined together. In this manner, using this capillary tubing, the supply of the expander 34 with pressurized hydraulic fluid from the source of pressurized hydraulic fluid 26 can be ensured.

The capillary tubes 52 and 52' comprise helically wound parts 53 which enable the capillary to have a degree of flexibility when the flexible tube 30, the liner 12 and the expander 34 travel inside the flexible tube 31.

The expander 34 has a lower expansion chamber 55, an upper expansion chamber 56 and a central body 54 perforated with an axial channel enabling the expansion chambers 55 and 56 to be interconnected. The lower expansion chamber 55 communicates with the end of the capillary 52' in order to be supplied iwth pressurized fluid. The upper expansion chamber 56 is supplied with pressurized fluid from the chamber 55, via the channel in the central body 54 of the expander.

The entry of pressurized fluid into the expansion chambers 55 and 56 enables their jackets to dilate in the radial direction and to transmit this radial deformation to the liner 12, when this liner has been inserted into the tube 8 which is to be lined.

Reference will now be made to FIGS. 4 and 6 in order to describe the operation of the device during the stages of insertion and of expansion of a lining liner in a steam generator tube.

To start with, the arm 20 and the guiding and insertion device 21 are in the position shown in FIG. 4. An operator placed at the operating station 18 opens the loading tube 24 by separating the two half-covers 24a and 24b after ensuring the unlocking of the devices 45.

A lining liner 12, into which an expander 34, connected to a length of flexible connection, has been inserted, as shown in FIG. 10, is then inserted into the open loading tube. The flexible connecting length is connected to the end of the flexible tube 30 by means of the removable quick coupling 51.

The loading tube 24 is then closed and locked, and then the puller-pusher 23 is started up, in the pushing direction, to move the flexible tube 30 carrying, at its end, the liner 12 and the hydraulic expander 34, first into the loading tube 12 and then into the flexible tube 31, until the liner 12 enters the tubular guiding and insertion member 21.

The length of the flexible tube which is moved by the pusher-puller is monitored by counting the number of rotations of a mesuring roller in contact with the flexible tube in the puller-pusher 23, and by means of presence-detectors placed in the member 21.

The tubular guiding and insertion member 21 is then brought into the position shown in FIG. 6, vertically in line with the tube 8 which is to be lined. During the travel of the tubular member 21 from its position shown in FIG. 4 as far as its position shown in FIG. 6, the flexible tube 31, the tubular flexible member 30 and the capillary tube 52, 52' deformed to follow the motion of the guiding member 21.

When the guiding membr 21 is in a position vertically in line with the tube 8, the double-action jack 36 for vertically moving the tubular guiding member 21 is powered in the direction of the rise of the member 21, until the latter docks with the end of the tube 8. The puller-pusher 23 is then restarted until the liner 12 has reached its final position inside the tube 8. This position can be monitored by measuring the displacement of the flexible member 30 at the puller-pusher, by means of detectors placed in the member 21, by measuring the thrust force on a force-detector placed between the tube 24 and the coupling 44, and by a camera which monitors the insertion and is situated on the appliance 21.

Pressurized hydraulic fluid is then injected into the capillary tube 52–52', from the source 26, in order to feed the hydraulic expander 34. The expansion chambers 55 and 56 dilate and produce a diametral expansion of the liner 12 inside the tube 8, until the outer wall of the liner 12 comes into contact with the inner surface of the tube 8. The pressure in the capillary tube and in the xapander is then relaeased and the expander is extracted by powering the double-action jack 36 of the tubular guiding member 21 in the direction of descent. In fact, it may be necessary to exert some degree of pull on the expander in order to extract it from the liner 12 and the tube 8, since the walls of the expansion chambers 55 and 56 retain some residual deformation after the pressure of the hydraulic fluid has been released.

The puller-pusher is then started up in the pulling direction and the expander is reinserted into the member 21. The member 21 is then brought vertically in line with the manhole 10. The expander can then be recovered from the end of the flexible tube 30, in the loading tube 24, after this tube has been opened.

The flexible tubular member 30 is generally a plastic tube, and preferably a Rilsan tube, which has both flexibility and strength properties sufficient to ensure the travel in the flexible tube 31 and the thrust on the lining and the expander.

Figure 11:
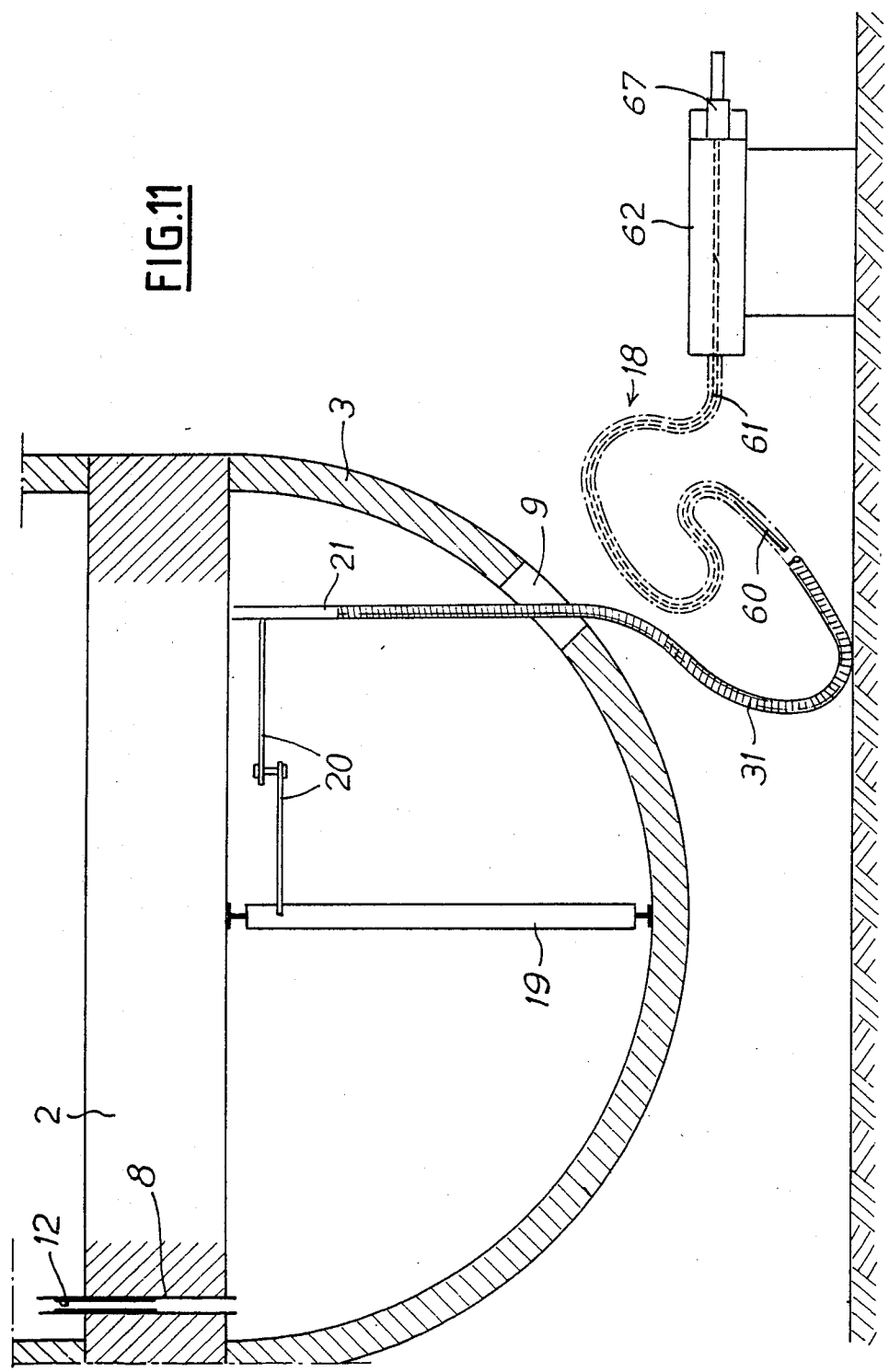
FIG. 11 is a general diagrammatic view of the appliance used for the roller-expanding of a lining liner in the region situated outside the tube plate, when it is inserted into the water box of a steam generator.
Figure 12:
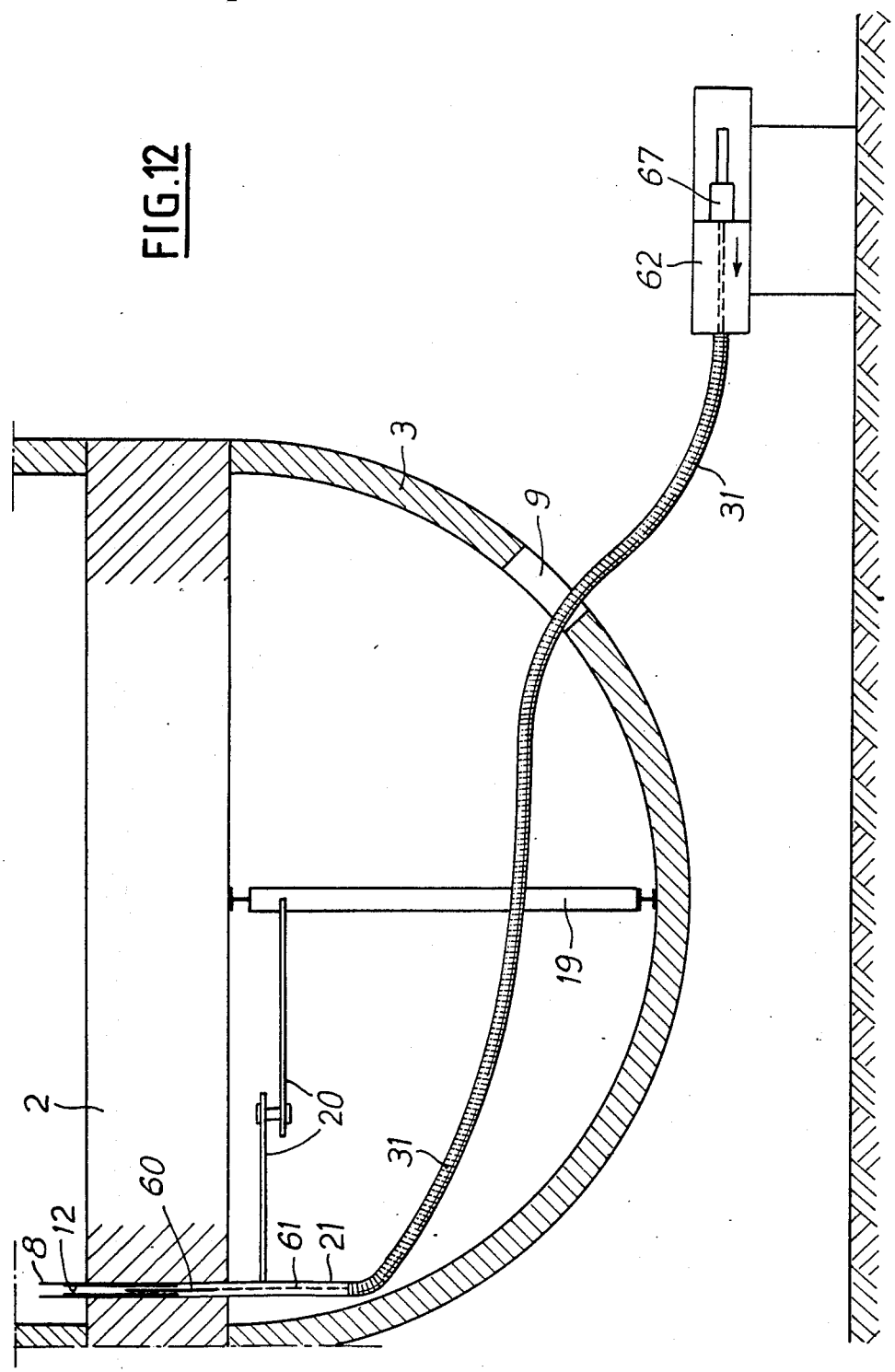
FIG. 12 is a general diagrammatic view of the roller-expanding appliance shown in FIG. 11, when it is inserted into a steam generator tube during the lining operation.

FIGS. 11 and 12 show the assembly of the device required for implementing the succeeding stage of the lining process, namely, the roller-expanding of the upper part of the liner, in the region of the tube 8 which is situated outside the tube plate 2.

In FIG. 11, the equipment has been shown in the stage of insertion of the roller-expanding appliance into the water box, and in FIG. 12, the equipment has been shown during the stage of insertion of the roller-expanding appliance into the tube during the lining operation.

The components of the equipment which are arranged in the water box are identical to those used in the preceding stages and shown in FIGS. 4 and 6. Similarly, the flexible tube 31, connected to the tubular guiding member 21 is also used and its end is outside the water box, in the vicinity of the operating station 18. This end is now completely free in the initial stage shown in FIG. 11, for the manual insertion of the roller-expanding tool 60 into this end of the flexible tube 31. The roller-expanding tool 60 is connected to a flexible tubular member 61 similar to the tubular member 30 and also capable of consisting of a Rilsan tube. The tubular member 61 is connected to the movable members of an insertion device 62, in which the roller-expanding machine is also placed, and which will be described in more detail with reference to FIG. 13.

The insertion device comprises a parallelepipedal casing 63 resting on the floor at the operating station by means of a pedestal 64. Guide bars 65 are fixed inside the casing 63, along its longitudinal direction, and guide plates of rectangular shape 66 are mounted so that they can slide on the bars 65 and inside the casing 63, in the longitudinal direction of the casing. The flexible tubular member 61 passes through each of the plates 66 in its middle zone, so as to be mounted slidingly in these plates. The end plate 66a carries the roller-expanding machine 67, on which the end of the flexible tube 61 is mounted in a rigid manner. The plates 66 are connected together at each of their top ends and at the end of the casing which is away from the roller-expanding machine, by a set of small chains 68.

A belt 69 having an internal set of cogs is mounted in the casing 63, on two, driving and return, pinions 70 and 71, respectively. The driving pinion 70 is connected to a driving motor (not shown).

The end plate 66a is connected to the belt 69 by means of a coupling bar 73.

It will thus be understood that the roller-expanding machine 67 and the flexible tube 61 are driven with a lengthwise motion when the motor driving the belt 69 is switched on. The lengthwise motion may be produced by a screw-and-nut system instead and in place of the belt.

Figure 13:
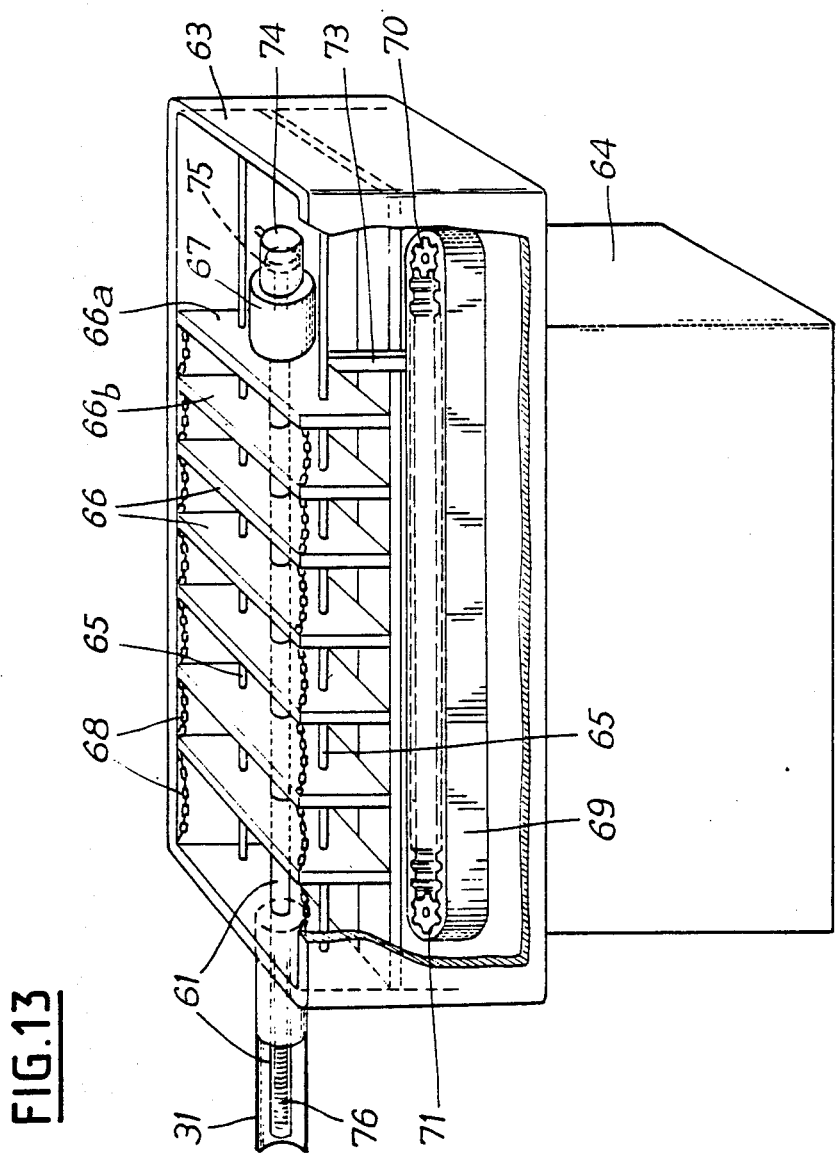
FIG. 13 is a detailed perspective view of the drive assembly of the roller-expanding device shown in FIGS. 11 and 12.

When the motion is produced in the forward direction, i.e., from right to left in FIG. 13, the plate 66a drives the roller-expanding machine 67 and the tube 61 until the plate 66a comes into contact with the second plate 66b, which it starts driving; gradually, the flexible tube 61 is thus driven while being guided and kept rigid by the plates 66.

When the motion is produced in the extraction direction, i.e., from the left to the right in FIG. 13, the plates 66 regain their position shown in the figure, by virtue of the small chains 68.

As can be seen in FIGS. 13, 14 and 15, the roller-expanding machine comprises a double-action jack 74 comprising a reciprocating piston 75 connected via a flexible member 76 to the needle 77 of the roller-expander shown in FIG. 15. The roller-expanding machine 67 also somprises a motor enabling the flexible member 76 and the needle 77 to be rotated to transmit the rotary motion to the rollers 78 of the roller-expander 79. The roller-expander 79 itself is fixed, in its lower part, to the flexible tube 61 through which the flexible member 76 passes. As shown in FIG. 15, in its working position, the roller-expander abuts with its lower part on the lower end of the liner 12 which has previously been subjected to a diametral expansion, as described above.

The needle 77 inserted into the central part of the roller-expander 79 is frusto-conical in shape and comes to bear on the rollers 78, both to drive then in rotation and also to push them apart, in order to perform the roller-expanding. For this purpose, the needle 77 may be driven in rotation by the flexible member 76 and simulataneously pushed upwards by virtue of the action of the jack 74.

A description will now be given, with reference to FIGS. 11 and 12, of an operation of roller-expanding of the upper part of a liner 12 placed inside a tube 8 and having previously been subjected to a radial expansion in its two end regions, as described above.

The roller-expanding operation is performed in the upper expansion region of the liner 12, i.e., to in the region of the tube 8 which is above the tube plate 2.

To start with, as shown in FIG. 11, the arm 20 of the manipulating device 19 is in a position where the tubular guiding member 21 is vertically in line with the manhole 9 of the water box 3. The flexible tube 31 has its end outside the water box, at the operating station 18.

The operator then inserts the roller-expanding tool assembly 60 comprising the roller-expander body 79, the rollers 78 and the needle 77, into the flexible tube 31. The insertion of the appliance 60 as far as the guiding member 21 is by hand and its accomplishment is monitored by the length of flexible tube 61 inserted into the flexible tube 31.

When the insertion of the roller-expanding tool 60 into the tubular guiding member 21 has been accomplished, the end of the flexible tube 31 away from the guiding member 21 is connected to the end of the casing 63 of the insertion machine 62. The tubular guiding member 21 is then placed vertically in line with the tube 8 containing the liner 12 to be subjected to roller-expanding, by rotating the arm 20. The new position of the arm 20, of the flexible member 31 and of the guiding member 21 is shown in FIG. 12.

The insertion of the roller-expanding tool 60 into the liner 12 is then accomplished by virtue of the insertion machine 62, as explained above.

The position of the roller-expanding tool in the liner 12 is monitored very accurately and the roller-expanding machine 67 is started up, the rotation of the needle 77 and the thrust transmitted by this needle making it possible to achieve laminating and crimping of the liner 12, inside the tube 8, in the upper region which has previusly been subjected to diametral expansion.

When the roller-expanding operation on the upper part of the liner has been accomplished, the assembly of the device permitting the roller-expanding is taken out of the water box and the roller-expanding of the lower part of this liner is performed, this part having been previously subjected to a diametral expansion by a method known in the prior art, i.e., with an automatic machine carried by the arm 20 of the manipulating device 19.

In fact, the roller-expanding of the upper part of the liner inside the tube 8 involves only relatively low stresses, the wall of the tube 8 undergoing a deformation, as shown in FIG. 3b. On the other hand, the lower region of the liner is situated in a part of the tube within the tube plate 2, with the result that the stresses which need to be applied to accomplish the crimping of the liner 12 by laminating its wall to the wall of the tube are much greater; it is therefore no longer possible to transmit the rotation and the thrust to the needle of the roller-expander by means of a long flexible member as in the case of the roller-expanding of the upper part of the liner.

It is quite obvious that the operations of insertion of a lining liner and of hydraulic expansion of this liner in a tube to be lined will be carried out successively for the group of steam generator tubes which need to be lined. This avoids having to dismantle the appliance which is used until all the steam generator tubes which are to be lined have been fitted with a liner, fastened provisionally by diametral expansion. In the same way, the operations of roller-expanding of the upper parts of the liners will be performed one after another, for all the tubes to be lined. These sequential operations on the steam generator tubes will be supplmented by an operation of roller-expanding of the lower part of the liners, by means of a known prior art technique.

It can be seen that the invention makes it possible to limit or completely do away with the presence of an operator inside the water box of the steam generator to perform the lining of the defective tubes of this steam generator, while avoiding the use of a complicated and bulky all-purpose appliance inserted into the water box of the steam generator.

The invention makes it possible to limit the part of the device which is inserted into the water box to what is really necessary for accomplishing the operations in situ inside the tube to be lined. The drive and control components are all arranged outside the water box, and this makes it very easily possible to have access to these components for monitoring the lining operations or to repair them. The process and the device according to the invention also make it possible to limit the size of the part of the appliance which is liable to be irradiated inside the water box of the steam generator. This appliance can be particularly simple and its insertion, as well as the insertion of the liner into the water box, are carried out in a very simple and very secure manner by virtue of a guidance by a continuous flexible tube.

The operations which require the presence of an operator in the water box or the use of a complicated and bulky device are limited to the roller-expanding of the lower part of the liner.

The invention is not limited to the embodiments which have been described.

It is possible to use appliances other than those which have been described to carry out the diametral expansion of the liner and the roller-expanding of its upper part.

The guidance of the liner and of the appliances, and the transmission of motions to the liner and of the appliances inside the water box, may be provided by flexible or supple tubes of a structure which is other than that described.

Lastly, the invention applies to the lining of any pressurized water steam generator tube, whatever its location in the water box of the steam generator and whatever the thickness of the tube plate in which the tube to be lined is fastened.

What is claimed is:

1. Device for remotely lining a steam generator tube of a pressurized water nuclear reactor, the tube (8) having two ends crimped into a tube plate (2) having a thickness, brelow said tube plate said steam generator forming a water box (3) accessible from outside through a manhold (9), by insertion of a liner (12) into said tube (8) through one of its ends, diametral expansion of said liner (12) in at least two expansion regions situated in the vicinity of its ends, one of said regions being within the thickness of said tube plate (2) and the other beyond said tube plate (2), and crimping by roller-expanding of said liner (12) in each of said regions, said device comprising (a) a manipulating means (19) equipped with an arm (20) whose end is vertically alignable with any one of the tubes (8) of said steam generator, under said tube plate (2);

(b) a tubular guiding member (21) attached to the end of said arm (20) in a direction at right-angles to said tube plate (2);

(c) a flexible tube (31) attached at one of its ends to said tubular guiding member (21) passing through said manhole and having its other end outside said water box;

(d) a loading and manipulating assembly (22, 23, 24) adapted to be connected to an end of the flexible tube (31) which is external to said water box for introducing and moving a liner (12), inside said flexible tube (31);

(e) a hydraulic expander (34) which is placed inside said liner (12) and attached, in order to be moved, to the end of a flexible tubular member (30) which is connected to means for supplying a pressurized hydraulic fluid to said expander (34); and (f) a manipulating and roller-expanding assembly (60, 61, 62) comprising a roller-expanding appliance (60), a tubular flexible member (61) and a manipulating device (62), said roller-expanding appliance being connected to an end of said flexible tubular member, and said manipulating device being arranged outside said water box and associated to said flexible member so that said flexible member (61) and said roller-expanding appliance (60) can move in said flexible tubing (31), said roller-expanding appliance (60) being further connected to driving means (67, 74, 75) by flexible member (76) passing through said flexible tubular member (61).

2. Lining device according to claim 1, wherein the assembly for loading and manipulating the liner comprises a winding and unwinding device (22), a puller-pusher withf rollers (23) and a loading tube (24) connected at one of its ends to the end of the tube (31) situated outside the water box and at its other end to the outlet of the puller-pusher (23), the winding and unwinding dwevice (22) containing a flexible tube (30) passing through the puller-pusher (23) on leaving the winding device (22).

3. Lining device according to claim 2, wherein the flexible tube (30) contains a capillary tube (52) for supplying hydraulic fluid to the expander (34), an end of the capillary tube (52) remote from the end connected to the expander (34) being connected to a source of pressurized fluid (26) by means of a rotary coupling (25) placed on the winding device (22).

4. Lining device according to claim 2, wherein the loading tube (24) comprises two semi-cylindrical half-covers (24f and 24b) articulated on a support (38) for changing from an open position to a closed position and vice versa.

5. Lining device according to claim 1, wherein the tubular gudiding member (21) is mounted for sliding movement in a direction at right-angles to the tube plate (2) in a bearing (33) carried by the end of the arm (20) and movable either way in said direction by means of a double-action jack (36).

6. Lining device according to claim 5, wherein the tubular guiding member (21) comprises a profiled component (21a) projecting inwards, for withdrawal by pulling of the mandrel (34) inserted into the liner (12).

7. Lining device according to claim 1, wherein the manipulating device (62) comprises a set of movable plates (66) guided in a casing (63) along a direction perpendicular to the set of plates (66) and connected to each other by small chains (68) and an assembly (69,70,71) for moving an end plate (66a) to which is fastened the end of the flexible tube (61) which passes through the other plates in a direction at right angles to these plates in which it is slideably mounted as to be capable of sliding.

8. Lining device according to claim 1, wherein the roller-expanding appliance comprises a body (79) having rotatable rollers (78) and a conical needle (77) mounted therein, said appliance being connected through its body (79) to the end of the flexible tube (61) remote from the manipulating dwevice (62) and, through its needle (77), to the end of a flexible member (76) passing inside the tube (61) and connected at its end remote from the needle (77) to the piston (75) of a jack (74) and to means (67) allowing the flexible member (76) and the needle (77) to be driven in rotation.

* * * * *